United States Patent
Manolakos et al.

(10) Patent No.: US 11,088,791 B2
(45) Date of Patent: Aug. 10, 2021

(54) CHOOSING AN SRS RESOURCE SET WHEN MULTIPLE SETS ARE CONFIGURED

(71) Applicant: QUALCOMM Incorporated, San Diego, CA (US)

(72) Inventors: Alexandros Manolakos, San Diego, CA (US); Alberto Rico Alvarino, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 16/415,622

(22) Filed: May 17, 2019

(65) Prior Publication Data

US 2019/0356431 A1 Nov. 21, 2019

Related U.S. Application Data

(60) Provisional application No. 62/674,498, filed on May 21, 2018.

(51) Int. Cl.
*H04L 5/00* (2006.01)
*H04W 76/28* (2018.01)
(Continued)

(52) U.S. Cl.
CPC .......... *H04L 5/001* (2013.01); *H04B 7/0602* (2013.01); *H04B 7/0639* (2013.01); *H04L 5/005* (2013.01);
(Continued)

(58) Field of Classification Search
None
See application file for complete search history.

(56) References Cited

U.S. PATENT DOCUMENTS

2013/0039202 A1* 2/2013 Feuersanger ........... H04L 5/001
370/252
2019/0222361 A1* 7/2019 Cheng ................. H04L 27/0014
(Continued)

FOREIGN PATENT DOCUMENTS

| CN | 109802810 A | * | 11/2017 |
| WO | WO-2017165751 A1 | | 9/2017 |
| WO | WO-2017173388 A1 | | 10/2017 |

OTHER PUBLICATIONS

U.S. Appl. No. 62/565,073 (Year: 2017).*
(Continued)

*Primary Examiner* — Andre Tacdiran
(74) *Attorney, Agent, or Firm* — Qualcomm Incorporated

(57) ABSTRACT

A method of wireless communication includes receiving, by a user equipment (UE) from a base station, a trigger for aperiodic sounding reference signal (SRS) transmission for a group of component carriers (CCs), and selecting for transmission, by the UE and in response to the trigger, one or more SRS resource sets for each CC of the group of one or more CCs. At least one CC has multiple SRS resource sets configured. The UE transmits, to the base station, an SRS on each CC of the group of CCs based on the selecting. Another method of wireless communication includes transmitting, by a base station to a UE, a trigger for aperiodic SRS transmission for a group of CCs. At least one CC has multiple SRS resource sets configured for the UE. The base station receives, from the UE, one or more SRS on each CC of the group of CCs.

56 Claims, 13 Drawing Sheets

(51) Int. Cl.
 *H04W 72/02* (2009.01)
 *H04B 7/06* (2006.01)
 *H04W 76/27* (2018.01)

(52) U.S. Cl.
 CPC .......... *H04W 72/02* (2013.01); *H04W 76/27* (2018.02); *H04W 76/28* (2018.02)

(56) References Cited

U.S. PATENT DOCUMENTS

| | | | |
|---|---|---|---|
| 2019/0268199 A1* | 8/2019 | Shi ........................ | H04W 24/10 |
| 2019/0349964 A1* | 11/2019 | Liou ................. | H04W 72/1284 |
| 2019/0356364 A1* | 11/2019 | Maamari ............... | H04L 5/0062 |
| 2020/0052853 A1* | 2/2020 | Qin ................... | H04W 72/1268 |
| 2020/0067739 A1* | 2/2020 | Tang ..................... | H04W 80/02 |
| 2020/0106647 A1* | 4/2020 | Chen ................ | H04W 72/0473 |
| 2020/0162214 A1* | 5/2020 | Tang ..................... | H04L 5/0094 |
| 2020/0235802 A1* | 7/2020 | Nilsson ................. | H04B 7/088 |
| 2020/0252241 A1* | 8/2020 | Park ................... | H04W 72/042 |
| 2020/0280404 A1* | 9/2020 | Qin ....................... | H04L 5/0057 |
| 2020/0404593 A1* | 12/2020 | Yao .................... | H04W 52/242 |

OTHER PUBLICATIONS

3GPP TS 38.306 v15.1.0 (Mar. 2018). User Equipment (UE) radio access capabilities (Year: 2018).*
3GPP TS 36.213 V15.1.0 Mar. 2018). Physical layer procedures. (Year: 2018).*
3GPP TSG-RAN2 Meeting #105. Introduction of late drop NGEN-DC, NE-DC and NR-DC. Athens, Greece, Feb. 25-Mar. 1, 2018 (Year: 2018).*
International Search Report and Written Opinion—PCT/US2019/033068—ISA/EPO—dated Jul. 29, 2019.

\* cited by examiner

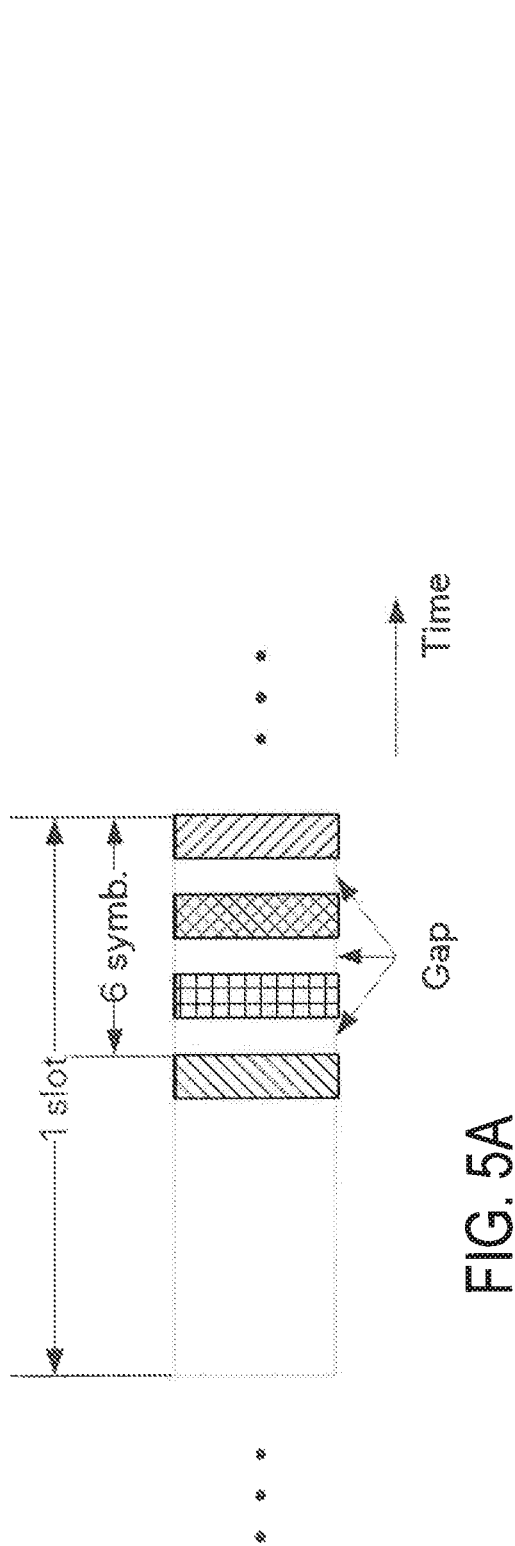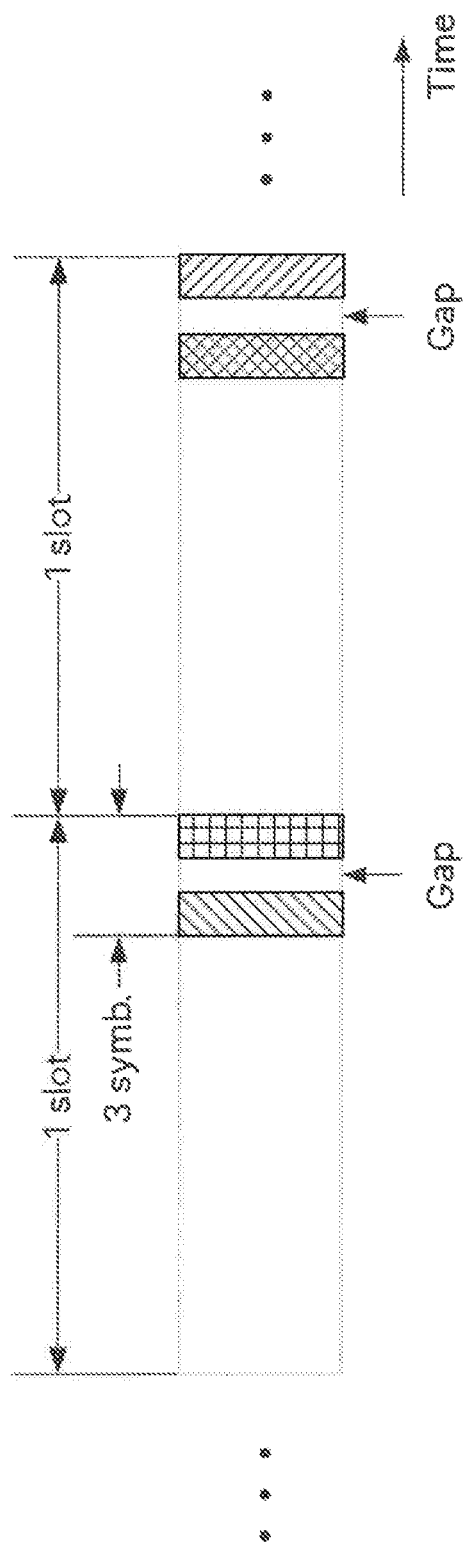
FIG. 5A
FIG. 5B

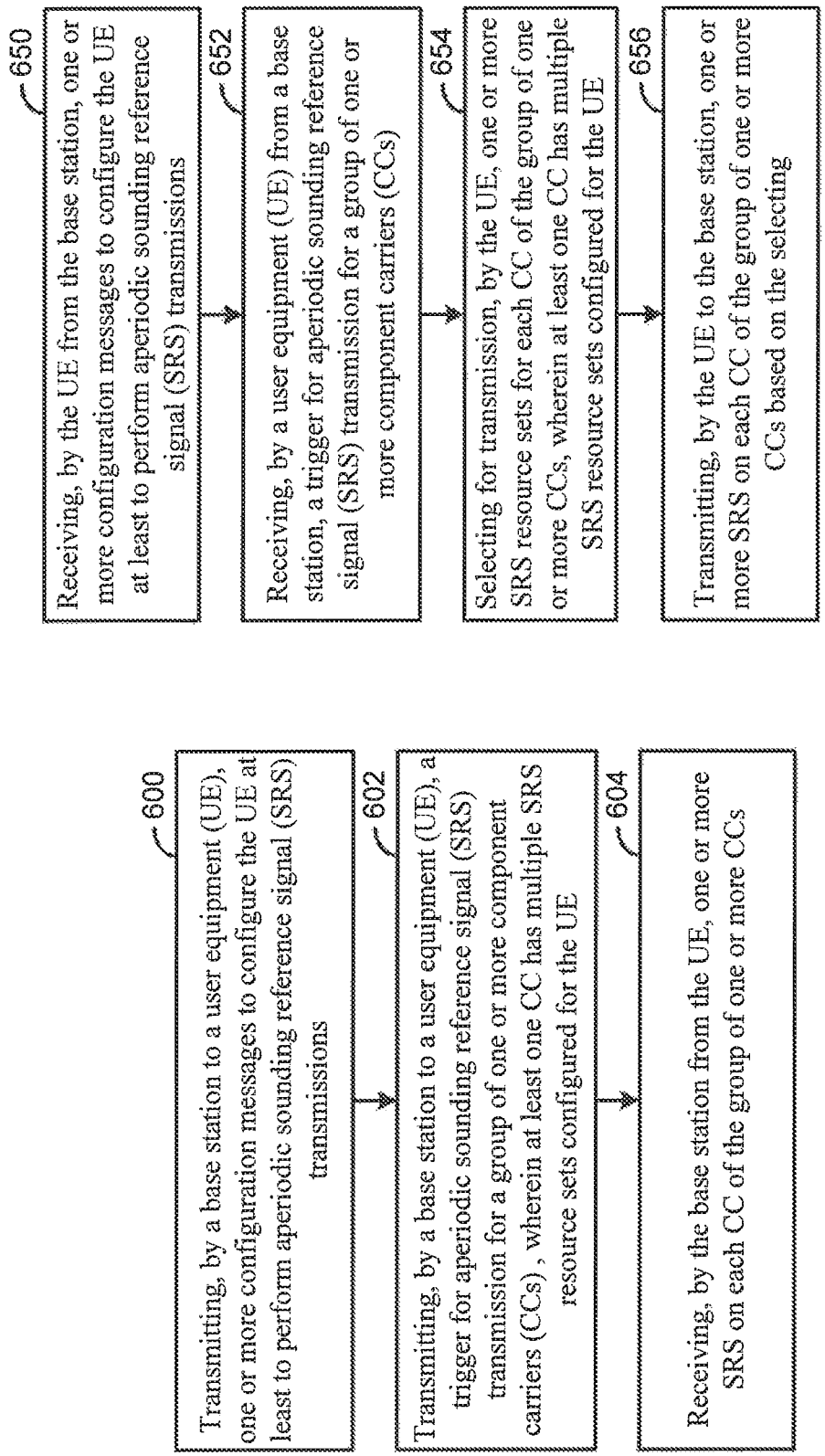

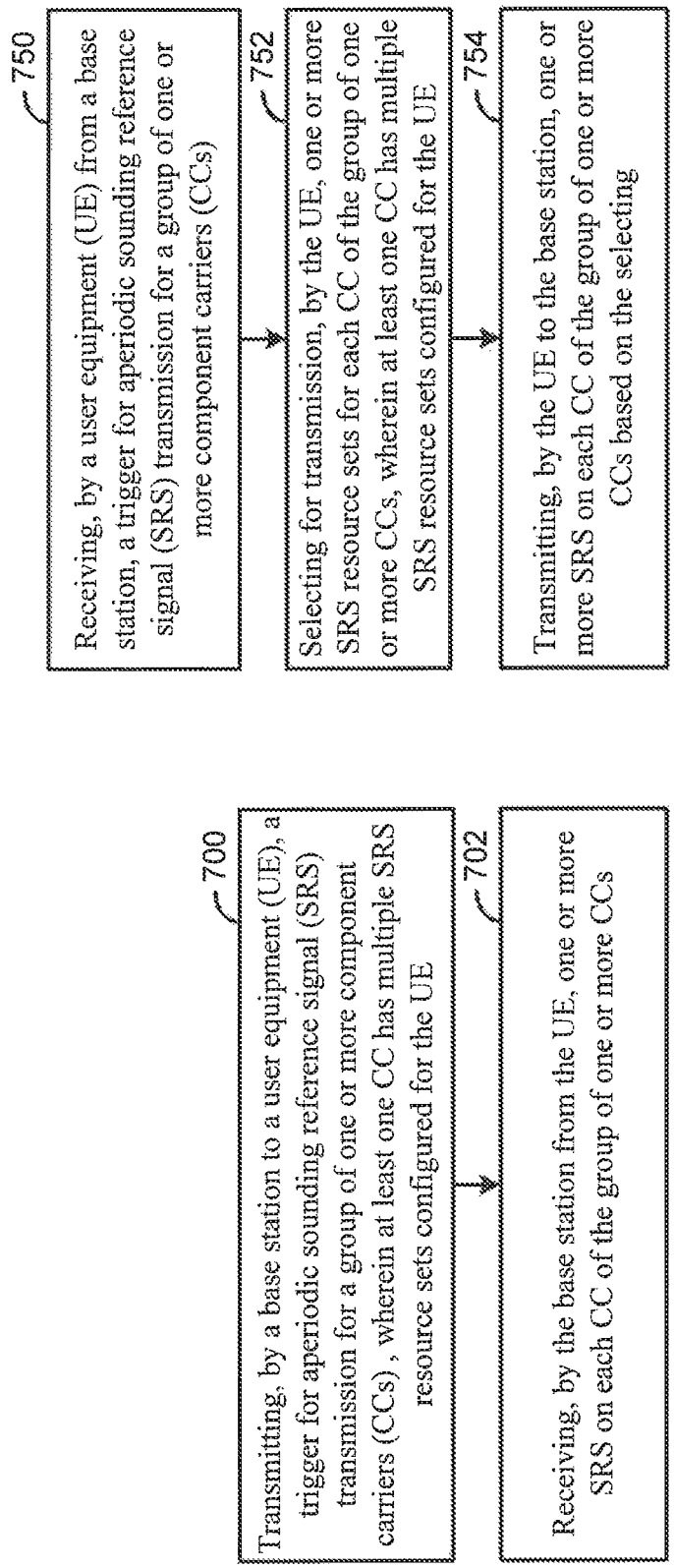

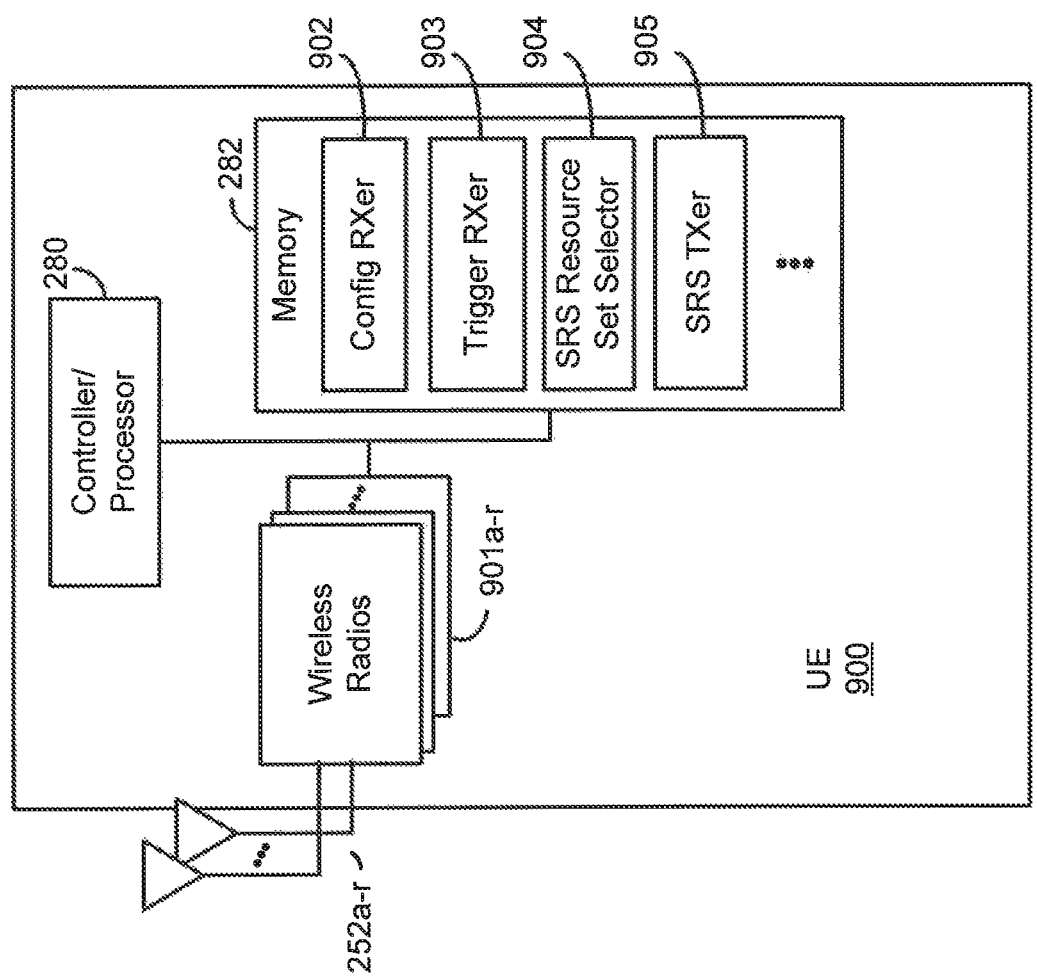

CHOOSING AN SRS RESOURCE SET WHEN MULTIPLE SETS ARE CONFIGURED

CROSS-REFERENCE TO RELATED APPLICATIONS

The present application claims the benefit of U.S. Provisional Patent Application No. 62/674,498, filed on May 21, 2018, the disclosure of which is incorporated herein by reference in its entirety.

TECHNICAL FIELD

Aspects of the present disclosure relate generally to wireless communication systems, and more particularly, to SRS resource set selection in response to an aperiodic trigger.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

In new radio (NR) Release 15, a UE can be configured with multiple SRS resource sets in each CC. For example, a CC can be configured with 1 SRS resource set for codebook-based uplink, 1 SRS resource set for non-codebook-based uplink, up to 2 SRS resource sets for antenna switching, and/or up to 8 SRS resource sets for beam management. A UE can be configured with multiple SRS resource sets in each CC. In such a scenario, methods of enabling the LE to choose among the multiple configured SRS resource sets can improve UE performance.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication includes receiving, by a user equipment (UE) from a base station, a trigger for aperiodic sounding reference signal (SRS) transmission for a group of one or more component carriers (CCs). The method additionally includes selecting for transmission, by the UE and in response to the trigger, one or more SRS resource sets for each CC of the group of one or more CCs, wherein at least one CC has multiple SRS resource sets configured for the UE. The method also includes transmitting, by the UE to the base station, one or more SRS on each CC of the group of one or more CCs based on the selecting.

In another aspect, a method of wireless communication includes transmitting, by a base station to a user equipment (UE), a trigger for aperiodic sounding reference signal (SRS) transmission for a group of one or more component carriers (CCs), wherein at least one CC has multiple SRS resource sets configured for the UE. The method additionally includes receiving, by the base station from the UE, one or more SRS on each CC of the group of one or more CCs.

In another aspect, an apparatus for wireless communication includes means for receiving, by a user equipment (UE) from a base station, a trigger for aperiodic sounding reference signal (SRS) transmission for a group of one or more component carriers (CCs). The apparatus additionally includes means for selecting for transmission, by the UE and in response to the trigger, one or more SRS resource sets for each CC of the group of one or more CCs, wherein at least one CC has multiple SRS resource sets configured for the UE. The apparatus also includes means for transmitting, by the UE to the base station, one or more SRS on each CC of the group of one or more CCs based on the selecting.

In another aspect, an apparatus for wireless communication includes means for transmitting, by a base station to a user equipment (UE), a trigger for aperiodic sounding reference signal (SRS) transmission for a group of one or more component carriers (CCs), wherein at least one CC has multiple SRS resource sets configured for the UE. The apparatus also includes means for receiving, by the base station from the UE, one or more SRS on each CC of the group of one or more CCs.

In another aspect, an apparatus for wireless communication includes at least one processor and at least one memory coupled to the at least one processor. The at least one processor is configured to receive, by a user equipment (UE) from a base station, a trigger for aperiodic sounding reference signal (SRS) transmission for a group of one or more component carriers (CCs). The at least one processor is additionally configured to select for transmission, by the UE and in response to the trigger, one or more SRS resource sets for each CC of the group of one or more CCs, wherein at least one CC has multiple SRS resource sets configured for the UE. The at least one processor is also configured to transmit, by the UE to the base station, one or more SRS on each CC of the group of one or more CCs based on the selecting.

In another aspect, an apparatus for wireless communication includes at least one processor and at least one memory coupled to the at least one processor. The at least one processor is configured to transmit, by a base station to a user equipment (UE), a trigger for aperiodic sounding reference signal (SRS) transmission for a group of one or more component carriers (CCs), wherein at least one CC has multiple SRS resource sets configured for the UE. The at least one processor is additionally configured to receive, by the base station from the UE, one or more SRS on each CC of the group of one or more CCs.

In another aspect, a non-transitory computer-readable medium has instructions recorded thereon that, when enacted by one or more computer processors, cause the one or more computer processors to receive, by a user equipment (UE) from a base station, a trigger for aperiodic sounding reference signal (SRS) transmission for a group of one or more component carriers (CCs). The instructions additionally cause the one or more computer processors to select for transmission, by the UE and in response to the trigger, one or more SRS resource sets for each CC of the group of one or more CCs, wherein at least one CC has multiple SRS resource sets configured for the UE. The instructions also cause the one or more computer processors to transmit, by the UE to the base station, one or more SRS on each CC of the group of one or more CCs based on the selecting.

In another aspect, a non-transitory computer-readable medium has instructions recorded thereon that, when enacted by one or more computer processors, cause the one or more computer processors to transmit, by a base station to a user equipment (UE), a trigger for aperiodic sounding reference signal (SRS) transmission for a group of one or more component carriers (CCs), wherein at least one CC has multiple SRS resource sets configured for the UE. The instructions additionally cause the one or more computer processors to receive, by the base station from the UE, one or more SRS on each CC of the group of one or more CCs.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3A is a block diagram illustrating sounding reference signal (SRS) resources and repetition according to some embodiments of the present disclosure.

FIG. 3B is a block diagram illustrating SRS resources with intra-slot frequency hopping according to some embodiments of the present disclosure.

FIG. 5A is a block diagram illustrating intra-slot SRS UE antenna switching for a 1T4R resource set according to some embodiments of the present disclosure.

FIG. 5B is a block diagram illustrating inter-slot SRS UE antenna switching for a 1T4R resource set according to some embodiments of the present disclosure.

FIG. 6A is a block diagram illustrating example blocks of a wireless communication procedure carried out by a base station configured according to some embodiments of the present disclosure.

FIG. 6B is a block diagram illustrating example blocks of a wireless communication procedure carried out by a user equipment (UE) configured according to some embodiments of the present disclosure.

FIG. 7A is a block diagram illustrating example blocks of a wireless communication procedure carried out by a base station configured according to some embodiments of the present disclosure.

FIG. 7B is a block diagram illustrating example blocks of a wireless communication procedure carried out by a user equipment (UE) configured according to some embodiments of the present disclosure.

FIG. 9 is a block diagram illustrating a UE configured according to some embodiments of the present disclosure.

DETAILED DESCRIPTION

Figure 1:
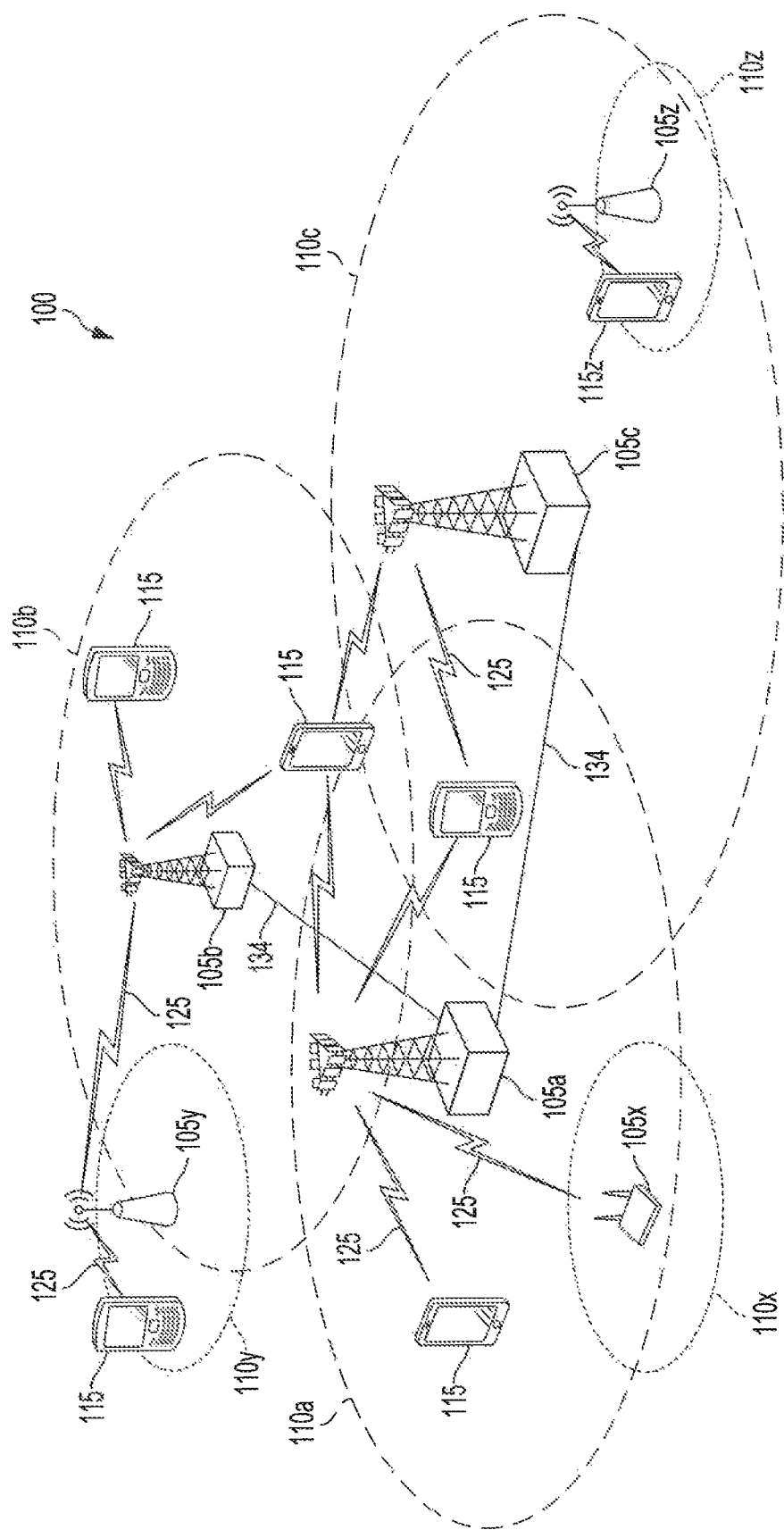
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a universal mobile telecommunications system (UMTS)/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of UMTS. In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the UMTS mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc., of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the tens "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105*a*, 105*b* and 105*c* are macro gNBs for the macro cells 110*a*, 110*b* and 110*c*, respectively. gNBs 105*x*, 105*y*, and 105*z* are small cell gNBs, which may include pico or femto gNBs that provide service to small cells 110*x*, 110*y*, and 110*z*, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copier, a quad-copier, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
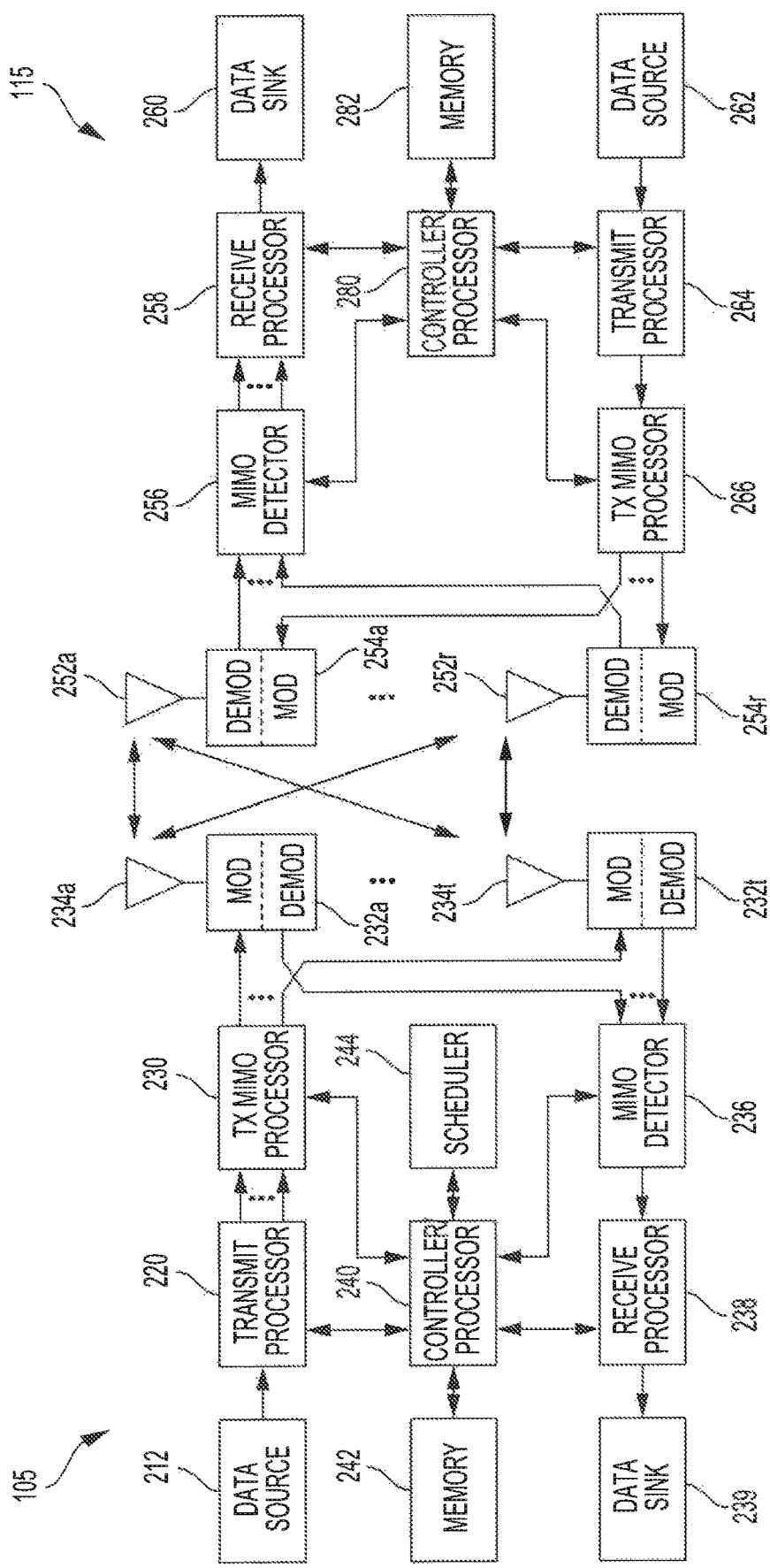
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105*z* in FIG. 1, and UE 115 may be UE 115*z*, which in order to access small cell gNB 105*z*, would be included in a list of accessible UEs for small cell gNB 105*z*. gNB 105 may also be a base station of some other type. gNB 105 may be equipped with antennas 234*a* through 234*t*, and UE 115 may be equipped with antennas 252*a* through 252*r*.

At gNB 105, transmit processor 220 may receive data from data source 212 and control information from controller/processor 240. The control information may be for the physical broadcast channel (PBCH), physical control format indicator channel (PCFICH), physical hybrid-AIQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODS) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from gNB 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254*a* through 254*r*, perform MIMO detection on the received symbols if applicable, and provide detected symbols.

Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the PUCCH) from controller/processor 280. Transmit processor 264 may also generate reference symbols for a reference signal. The symbols from transmit processor 264 may be preceded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for gNB 105 and UE 115, respectively. Scheduler 244 may schedule UEs for data transmission on the downlink and/or uplink.

For a sounding reference signal (SRS) resource, a given X-port SRS resource spans N=1, 2, or 4 adjacent symbols within a slot where all X ports are mapped to each symbol of the resource. Within the resource, each of the X ports are mapped to the same set of subcarriers in the same set of physical resource blocks (PRBs) in the N SRS symbols. A given SRS resource can be configured as aperiodic, periodic, or semi-persistent. According to a periodic configuration, the resource is configured with a slot-level periodicity and slot-offset. According to a semi-persistent configuration, the resource is configured with a slot-level periodicity and slot-offset, and the semi-persistent SRS resource set is activated/deactivated by a media access control (MAC) control element (CE). According to an aperiodic configuration, the SRS transmission is triggered using downlink control information (DCI), and aperiodic SRS resource(s) are triggered on a per set basis by DCI. For example, a downlink (DL)/uplink (UL)/Group common DCI can be used to trigger an aperiodic SRS resource set.

Regarding SRS time domain location, an SRS resource can be configured to occupy a location within at least the last 6 symbols in a slot. From a UE perspective, no frequency division multiplexing (FDM) may occur between a SRS and a short physical uplink control channel (PUSCH), and when PUSCH is scheduled in a slot, a SRS may be configured at least after the scheduled PUSCH and the corresponding demodulation reference signal (DMRS), It is envisioned that an SRS may be configured before the scheduled PUSCH and the corresponding DMRS.

An SRS resource can be configured with a repetition factor R. In this case, the X ports are mapped to each symbol of the resource and within the resource. Each of the X ports may be mapped to the same set of subcarriers in the same set of PRBs in the N SRS symbols.

Figure 3A:
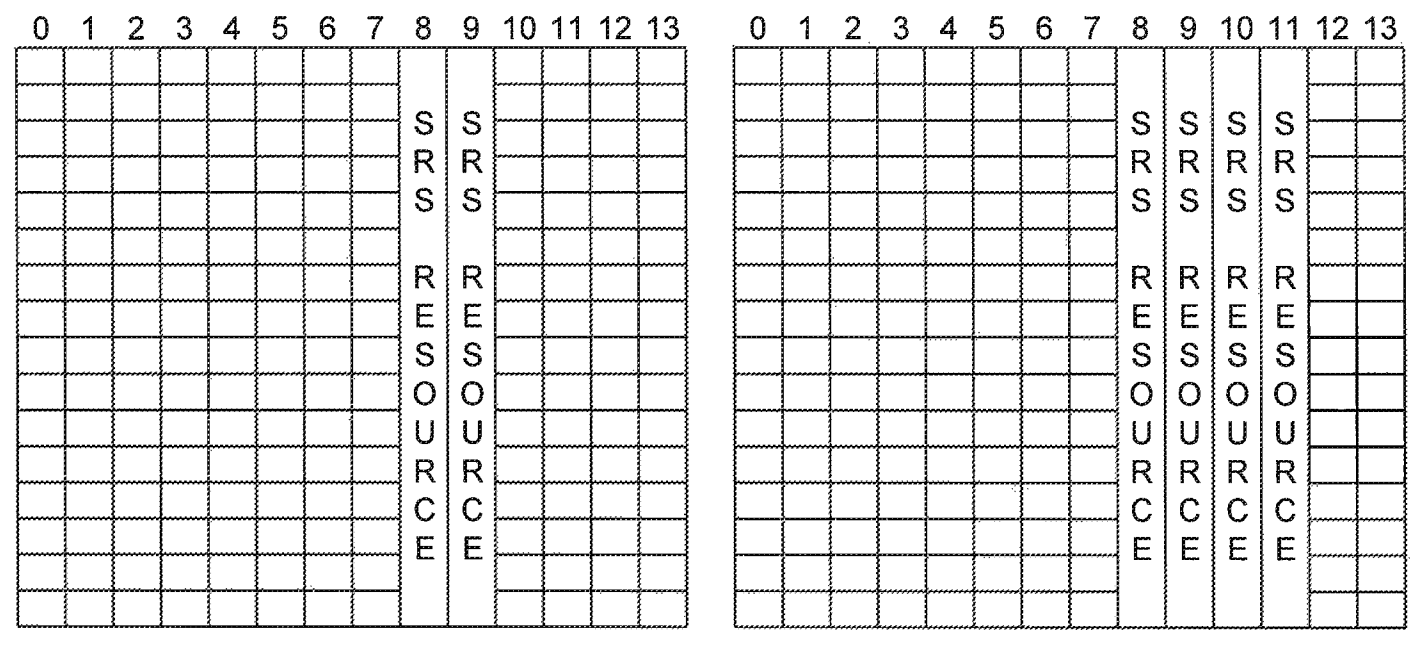
Figure 3B:
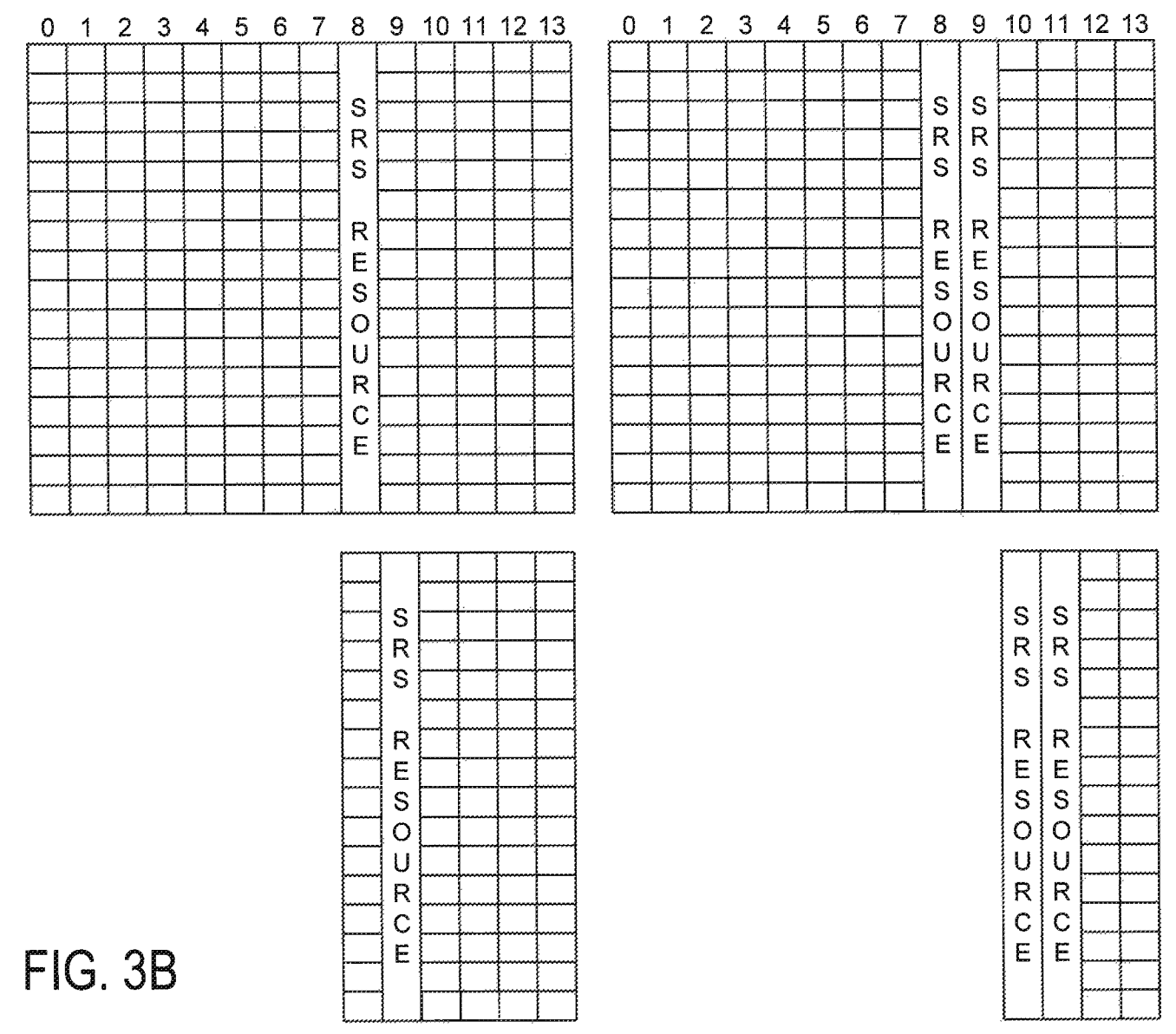
Figure 3C:
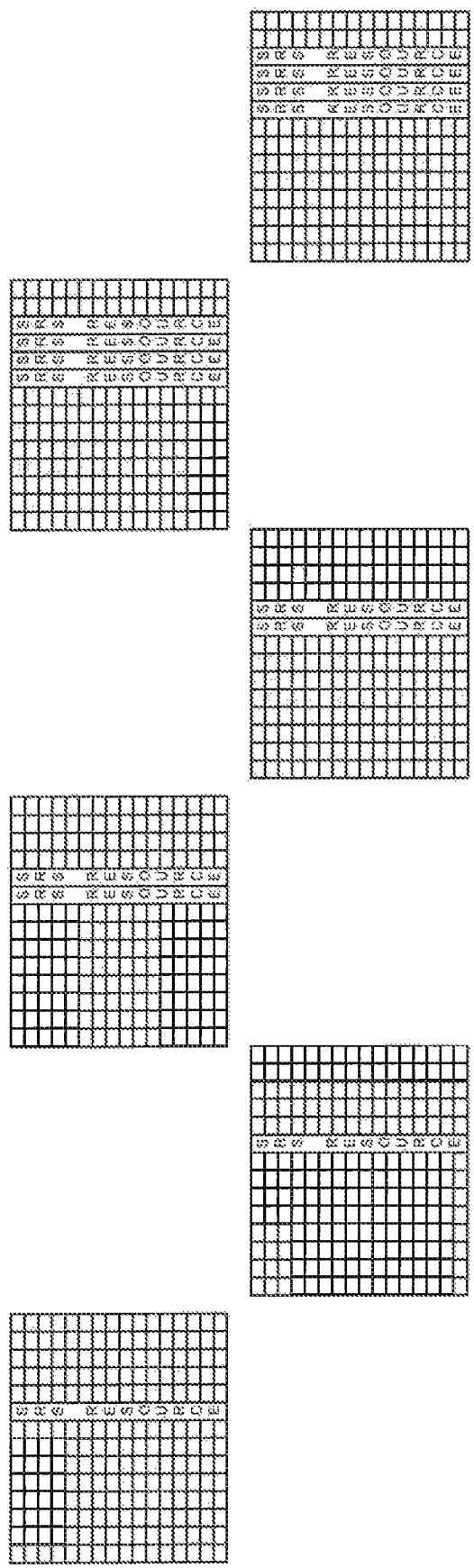
FIG. 3C is a block diagram illustrating SRS resources with inter-slot frequency hopping according to some embodiments of the present disclosure.

Referring to FIGS. 3A-3C, SRS resources are illustrated with repetition and hopping. For example, FIG. 3A illustrates SRS resources and simple repetition. In contrast to simple repetition, FIG. 3B illustrates SRS resources with intra-slot frequency hopping and FIG. 3C illustrates SRS resources with inter-slot frequency hopping.

Figure 4A:
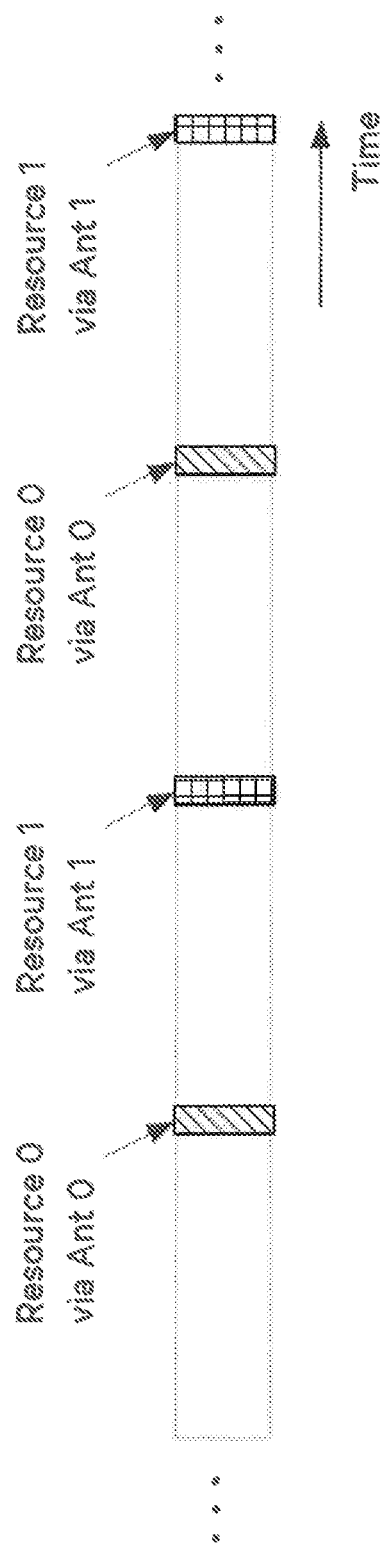
FIG. 4A is a block diagram illustrating SRS user equipment (UE) antenna switching for a 1T2R resource set according to some embodiments of the present disclosure.
Figure 4B:
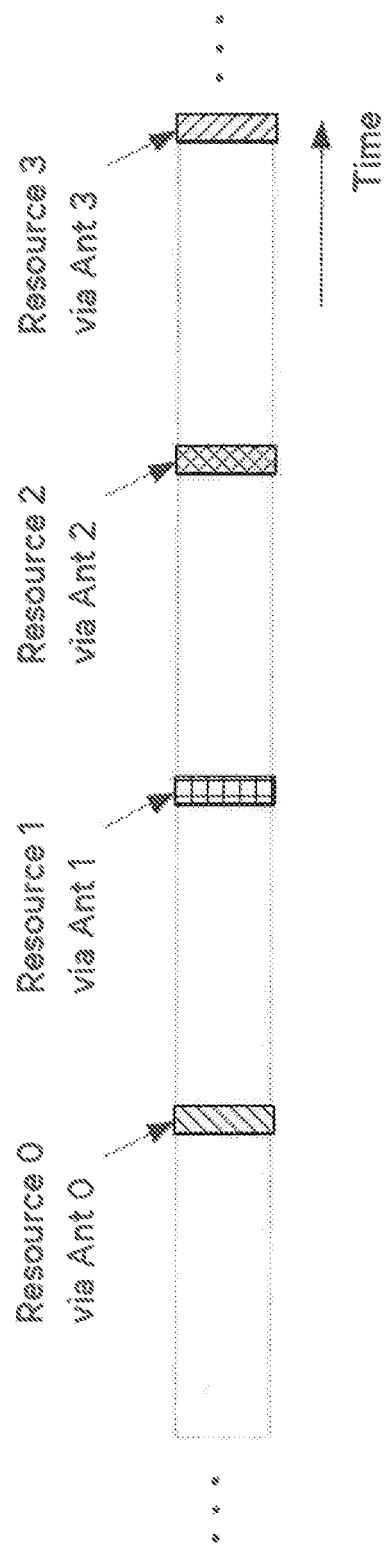
FIG. 4B is a block diagram illustrating SRS UE antenna switching for a 1T4R resource set according to some embodiments of the present disclosure.
Figure 4C:
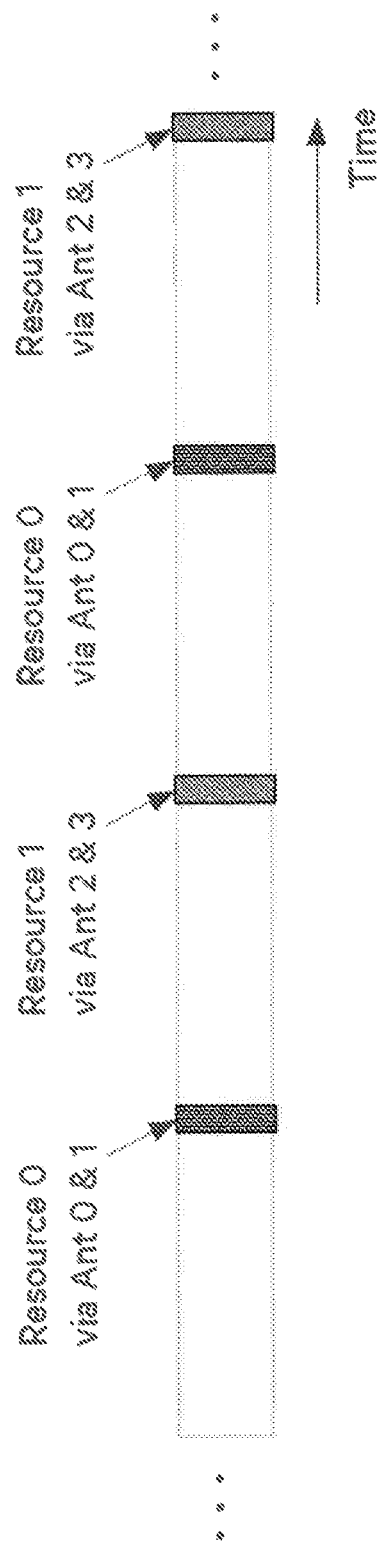
FIG. 4C is a block diagram illustrating SRS UE antenna switching for a 2T4R resource set according to some embodiments of the present disclosure.

Referring to FIGS. 4A-4C, SRS UE antenna switching is shown for 2 UE antenna ports (1T2R) and 4 UE antenna ports (1T4R) and (2T4R). For example, referring to FIG. 4A, antenna switching for 2 UE antenna ports (1T2R) utilizes two 1-port SRS resources, each transmitted via an antenna. Additionally, referring to FIG. 4B, antenna switching for four UE antenna ports (1T4R) utilizes four 1-port SRS resources, each transmitted via an antenna. Also, referring to FIG. 4C, antenna switching for 4 UE antenna ports (2T4R) utilizes two 2-port SRS resources, each transmitted via an antenna pair. According to these antenna switching techniques, different SRS resources are transmitted in different symbols, either in the same slot or in different slots. Also, a guard period of Y symbols in-between the SRS resources is used in case the SRS resources are transmitted in the same slot.

Turning to FIGS. 5A and 5B, the guard period (labeled in FIGS. 5A and 5B as "Gap") is defined by a value of Y that corresponds to enough symbols to span at least 15 μsec. As shown in FIG. 5A, intra-slot antenna switching for 1T4R utilizes 4 separate resources, each one with one port, and thus uses a total of 7 symbols in a slot due to inclusion of 1 guard symbol after every sounding opportunity. Alternatively, as shown in FIG. 5B, the UE can sound 2 ports in one slot, and 2 in the next slot, or sound 3 antennas in the first slot (5 symbols), and 1 in the next, and so on. It is envisioned that SRS UE antenna switching may be an optional feature. It is also envisioned that a UE may report to a base station which antennas can be sounded concurrently (called antenna port groups) depending on whether the UE is in an UL MIMO capable mode of operation.

From the foregoing description, it should be appreciated that NR supports NR SRS resources that span 1, 2, 4 adjacent symbols with up to 4 ports per SRS resource. It should additionally be appreciated that all ports of an SRS resource are sounded in each symbol, and an SRS resource may be transmitted aperiodically (DCI-signaled), semi-persistently, or periodically. Also, the SRS transmission may be wideband/subband, with SRS bandwidth being a multiple of 4 physical resource blocks (PRBs).

Switching is supported between partial bands for SRS transmissions in a CC at least when a UE is not capable of simultaneous transmission in partial bands in a CC. In some instances, "partial band" may also be referred to as "bandwidth part." Also, a UE may be configured with multiple resources, which may be grouped depending on use case, such as UL CSI acquisition, UL non-codebook precoding, or UL analog beamforming. Further, SRS antenna switching inside a carrier is supported.

In accordance with the present disclosure, an SRS resource set is a collection of SRS resources having the same power control information, and the SRS resources correspond to a collection of antenna ports. An SRS resource contains one or multiple SRS ports, and each SRS port may correspond to an actual UE physical antenna, or a virtual antenna constructed by an analog, digital, or hybrid precoding operation of the UE physical antennas. In this context, it is envisioned that NR SRS switching among CCs may be specified in a way that is similar to Rel-14 LTE SRS carrier-based switching design. For example, periodic/aperiodic/semi-persistent SRS may be configured on a CC without PUCCH/PUSCH. Additionally, timing advance (TA) through PRACH on a timing advance group (TAG) may be configured without PUSCH/PUCCH. Also, power control may be separated from that of PUSCH, and a group common DCI may be used for aperiodic SRS triggering and transmission power control (TPC). It is further envisioned that there may be DL/UL interruptions and collision handling due to SRS switching.

There are four different types of SRS resource sets that can be assigned to component carriers. One type of SRS resource set is an SRS resource set for codebook-based uplink. An additional type of SRS resource set is an SRS resource set for non-codebook-based uplink. Another type of SRS resource set is an SRS resource set for antenna switching. A further type of SRS resource set is an SRS resource set for beam management. The SRS resource set for antenna switching generally serves two distinct purposes: uplink transmission diversity for PUSCH, which may be either open loop or closed loop, and time division duplex (TDD) downlink MIMO beamforming based on channel reciprocity. Such a resource set supports antenna switching within a carrier. The other types of SRS resource sets do not involve antenna switching and are used for other purposes.

In new radio (NR) Release 15, a UE can be configured with multiple SRS resource sets in each CC. For example, a CC can be configured with one (1) SRS resource set for codebook-based uplink, one (1) SRS resource set for non-codebook-based uplink, up to two (2) SRS resource sets for antenna switching, and/or up to eight (8) SRS resource sets for beam management. The SRS resource sets assigned to a given carrier all have unique numerical indices. For example, one CC may be assigned two SRS resource sets of one or more types with indices 0 and 1, whereas another CC may be assigned four (4) SRS resource sets of one or more types having indices 0 to 4. When multiple SRS resource sets are assigned, the UE determines or selects one or more SRS resource sets for transmission when it is triggered in DCI format 2_3 with an aperiodic (Type-A) SRS for antenna switching, where the determining or selecting is based on one or more factors, criteria, or rules.

In some instances, the UE selects the SRS resource set that is for 'antenna switching' and may not transmit SRS resource sets of other types. If multiple SRS resource sets for antenna switching are configured, the UE may follow different options. For example, the UE may also transmit the remaining SRS resource set of the 'antenna switching' type. In other words, if there are two SRS resource sets for antenna switching, the UE may transmit both SRS resource sets of the "antenna switching" type. Alternatively, the UE may select one of the multiple SRS resource sets of the 'antenna switching' type for transmission based on certain factors. In some instances, for example, the UE may select the SRS resource set of the "antenna switching" type that has the smallest index.

In some instances, the UE picks the SRS resource set that has the smallest RRC-configured index without regard to the type of SRS resource. In this scenario, the UE does not preferentially select an SRS resource set of the 'antenna switching' type. Instead, for each CC in the group of CCs signaled by the trigger, the UE selects only one SRS resource set without regard to type, and the UE selects the set having the lowest index for each CC in the group of CCs signaled by the trigger. Stated differently, when the UE receives an aperiodic trigger for a group of CCs, the UE selects the lowest index SRS resource set for each CC, even if the lowest indexed SRS resource set is not an SRS resource set for antenna switching.

In some instances, the UE transmits SRS resource sets that are associated with a specific SRS triggering state on that CC. For example, each triggering state can be associated with multiple SRS resource sets. Then, the wireless standard may specify that whenever Type-A SRS antenna switching triggering occurs, the UE transmits all of the SRS resource sets associated with the state (e.g., 00, 01, 10, 11, etc.) specified by the trigger. Thus, if an aperiodic trigger value of '01' is specified to trigger SRS transmission on the same CC on which the aperiodic trigger was received, then the SRS resource sets associated with that trigger value (i.e., triggering state) may be selected. Similarly, if an aperiodic trigger value of '10' is specified to trigger SRS transmission on a group of CCs as defined by higher layers, then the SRS resource sets associated with that trigger value (i.e., triggering state) may be selected. In the same way, if an aperiodic trigger value of '11' is specified to trigger SRS transmission on another group of CCs as defined by higher layers, then the SRS resource sets associated with that trigger value (i.e., triggering state) may be selected. In another example, a CC may transition from one "state" to another over a period of time or in response to certain conditions or signals. Each state of the CC may be associated with a particular set of SRS resource sets. In an example, a first state of the CC may be associated with a SRS resource set type for antenna switching and a second state of the CC may be associated with a SRS resource set type for beam management. If the trigger for an SRS transmission on a CC is received by the UE while the CC is considered to be in the first state, the UE would then select the SRS resource set type for antenna switching based on the associated SRS resource set with that CC. The above description is one example of SRS triggering states associated with CCs, and other examples and configurations are within the scope of the present disclosure. For example, a particular triggering state of a CC may be associated with more than one SRS resource set of the same type or may be associated with SRS resource sets belonging to more than one SRS resource set type.

In some instances, the base station may indicate in the DCI which SRS resource sets to use for an SRS transmission. For example, when the UE has multiple SRS resource sets configured in a CC, then the number of bits in the downlink control information (DCI) may increase (e.g., from 2 bits to 4 bits). With these extra bits, the aperiodic trigger can specify both sets of CCs and SRS resource sets in each CC. The first 2 bits may specify a set of CCs, and the second 2 bits may specify the SRS resource set with that index in each of the CCs in the set. The base station and the UE have knowledge that the UE is configured with multiple SRS resource sets for at least one CC. Conditioned on such a current configuration, the base station can use the DCI having the extra bits, and the UE can decode the DCI and interpret the extra bits appropriately.

In some instances, an RRC parameter can be added to configure the index of SRS resource set(s) together with the groups of CCs. In this way, the base station can configure which SRS resource set should be used for each CC whenever the base station sends a configuration message to configure the groups of CCs that are selected by the different values of the aperiodic trigger. Such a configuration message can also be sent to reconfigure the selection of the SRS resource sets even if no change is made to the groups of CCs. It is envisioned that the index is configured per CC. Accordingly, a configuration message can be sent to reconfigure the groups of CCs even if no change is made to the indices per CC.

In some instances, an RRC parameter can be added inside the SRS resource set configuration. This parameter may indicate which SRS resource set is supposed to be used with Type-A SRS antenna switching. For example, a single bit flag may be set for each SRS resource set to indicate whether the SRS resource set should be selected for transmission.

In some instances, the base station may use media access control (MAC) control element (CE) activation of the SRS resource set index per CC. MAC CE deactivation can also be supported. Once activated and until deactivated, the SRS resource set is transmitted in response to the aperiodic trigger whenever the corresponding CC is selected by the trigger.

In some instances, the UE transmits all the configured. SRS resource sets according to a predetermined order. For example, the ordering could be: "CC-first resource-sets-second." Stated differently, the UE first goes to the first (i.e., lowest index) CC, and transmits the resource sets in that CC in sequence of lowest index to highest, and then proceeds to the next lowest index CC, and so on. The base station expects to receive the SRS according to this sequence. In some instances, the base station may signal the ordering of the SRS resource set transmissions to the UE in a higher layer signal, or the ordering may be based on a predefined rule, such as defined in a wireless standard, for example.

Turning to FIG. 6A, a method of wireless communication carried out by a base station begins at block 600. Block 600 includes transmitting, by a base station to a user equipment (up, one or more configuration messages to configure the UE at least to perform aperiodic sounding reference signal (SRS) transmissions. For example, block 600 may include configuring one or multiple SRS resource sets per CC for the UE, and/or configuring groups of CCs to be selected for aperiodic reporting according to a value of a trigger. Alternatively or additionally, block 600 may include transmitting, by the base station to the UE, a configuration message specifying, for each CC and for each SRS resource set, an associated triggering state. In an additional implementation, block 600 may include transmitting, by the base station to the UE, a radio resource control (RRC) message having at least one parameter to configure one or more indices of the SRS resource sets together with one or more groups of CCs. In another implementation, block 600 may include transmitting, by the base station to the UE, an RRC message having at least one parameter to configure the SRS resource sets with an indication of which SRS resource set of multiple SRS resource sets configured for a carrier is to be transmitted in the event of aperiodic SRS antenna switching. In a further implementation, block 600 may include transmitting by the base station to the UE via at least one media access control (MAC) control element (CE), an activation of one or more SRS resource set indices per CC. Processing may proceed from block 600 to block 602.

Block 602 includes transmitting, by a base station to a user equipment (UE), a trigger for aperiodic sounding reference signal (SRS) transmission for a group of one or more component carriers (CCs), wherein at least one CC has multiple SRS resource sets configured for the UE. In one implementation, block 602 may include transmitting a trigger having additional bits therein to specify which SRS resource sets should be selected, including transmitting the trigger having the additional bits only when the UE has been configured with multiple SRS resource sets for at least one CC. Means for performing the functionality of blocks 600 and 602 may, but not necessarily, include, for example, controller/processor 240, memory 242, transmit processor 220, TX MIMO processor 230, modulators 232, and/or antennas 234 with reference to FIG. 2 and wireless radios 801, configuration transmitter 802, and/or trigger transmitter 803 with reference to FIG. 8. Processing may proceed from block 602 to block 604.

Block 604 includes receiving, by the base station from the UE, one or more SRS on each CC of the group of one or more CCs. Means for performing the functionality of block 604 may, but not necessarily, include, for example, antennas 234, demodulators 232, MIMO detector 236, receive processor 238, controller/processor 240, and/or memory 242 with reference to FIG. 2 and wireless radios 801 and/or SRS receiver 804 with reference to FIG. 8. After block 604 processing may end. Alternatively, processing may return from block 604 to block 600 or block 602.

In one example, block 604 may include receiving, for each CC having multiple SRS resource sets configured, at least one of which is for antenna switching, one or more SRS transmissions corresponding to only one or more SRS resource sets that are for antenna switching. In this example, there are two options. A first option is to receive, for each CC having multiple SRS resource sets configured, one or more SRS transmissions corresponding to all SRS resource sets that are for antenna switching. A second option is to receive, for each CC having multiple SRS resource sets configured, one or more SRS transmissions corresponding to only an SRS resource set for antenna switching that has a smallest index.

In other examples, block 604 may include receiving, for each CC having multiple SRS resource sets configured, one or more SRS transmissions corresponding to only an SRS resource set having a smallest index. Alternatively and as mentioned above, block 600 may include transmitting, by the base station to the UE, a configuration message specifying, for each CC and for each SRS resource set, an associated triggering state. In this case, block 604 may include receiving one or more SRS transmissions corresponding to all SRS resource sets having a same associated triggering state. Alternatively, block 604 may include receiving, according to a predetermined sequence, one or more SRS transmissions corresponding to all SRS resource sets configured for each CC. For example, the predetermined sequence may receive, one CC at a time in ascending CC index order, all SRS resource sets configured for each CC in ascending SRS resource set index order.

Referring, to FIG. 6B, a method of wireless communication carried out by a UE begins at block 650. Block 650 includes receiving, by the UE from a base station, one or more configuration messages to configure the UE at least to perform aperiodic sounding reference signal (SRS) transmissions. For example, block 650 may include receiving a configuration of one or multiple SRS resource sets per CC for the UE, and/or receiving a configuration of groups of CCs to be selected for aperiodic reporting according to a value of a trigger. Alternatively or additionally, block 650 may include receiving a configuration message specifying, for each CC and for each SRS resource set, an associated triggering state. In an additional implementation, block 650 may include receiving a radio resource control (RRC) message having at least one parameter to configure one or more indices of the SRS resource sets together with one or more groups of CCs. In another implementation, block 650 may include receiving an RRC message having at least one parameter to configure the SRS resource sets with an indication of which SRS resource set of multiple SRS resource sets configured for a carrier is to be transmitted in the event of aperiodic SRS antenna switching. In a further implementation, block 650 may include receiving, via at least one media access control (MAC) control element (CE), an activation of one or more SRS resource set indices per CC. Processing may proceed from block 650 to block 652.

Block 652 includes receiving, by a user equipment (UE) from a base station, a trigger for aperiodic sounding reference signal (SRS) transmission for a group of one or more component carriers (CCs). In some implementations, block 652 may include receiving a trigger having additional bits therein to specify which SRS resource sets should be selected. Means for performing the functionality of blocks 650 and 652 may, but not necessarily, include, for example, antenna 252, demodulators 254, MIMO detector 256, receive processor 258, controller/processor 280, and/or memory 282 with reference to FIG. 2 and wireless radios 901, configuration receiver 902, and/or trigger receiver 903 with reference to FIG. 9. Processing may proceed from block 652 to block 654.

Block 654 includes selecting for transmission, by the UE and in response to the trigger, one or more SRS resource sets for each CC of the group of one or more CCs. At least one CC has multiple SRS resource sets configured for the UE. In one example, selecting for transmission the one or more SRS resource sets is conditioned on activation of a corresponding SRS resource set index based on receiving an activation of the corresponding SRS resource set index via the MAC CE. Processing may proceed from block 652 to block 654.

In one example, block 654 includes selecting for transmission, for each CC having multiple SRS resource sets configured, at least one of which is for antenna switching, only one or more SRS resource sets that are for antenna switching. In this example, there are two options. A first option is to select for transmission, for each CC having multiple SRS resource sets configured, all SRS resource sets that are for antenna switching. A second option is to select for transmission, for each CC having multiple SRS resource sets configured, only an SRS resource set for antenna switching that has a smallest index.

In other examples, block 654 may include selecting for transmission, for each CC having multiple SRS resource sets configured, only an SRS resource set having a smallest index. Alternatively and as mentioned above, block 650 may include receiving, by the UE from the base station, a configuration message specifying, for each CC and for each SRS resource set, an associated triggering state. In this case, block 654 may include selecting for transmission all SRS resource sets having a same associated triggering state. As another alternative and as also mentioned above, block 652 may include receiving a trigger having additional bits therein to specify which SRS resource sets should be selected. In this case, block 654 may include decoding the trigger with an expectation that it has the additional bits only when the UE has been configured with multiple SRS resource sets for at least one CC, and performing the selecting conditioned on contents of the additional bits. Alternatively, block 654 may include selecting for transmission, according to a predetermined sequence, all SRS resource sets configured for each CC. For example, the predetermined sequence may transmit, one CC at a time in ascending CC index order, all SRS resource sets configured for each CC in ascending SRS resource set index order. Means for performing the functionality of block 654 may, but not necessarily, include, for example, controller/processor 280, memory 282, transmit processor 264, and/or TX MIMO processor 266 with reference to FIG. 2 and SRS resource set selector 904 with reference to FIG. 9.

Block 656 includes transmitting, by the UE to the base station, one or more SRS on each CC of the group of one or more CCs based on the selecting performed at block 652. Means for performing the functionality of block 656 may, but not necessarily, include, for example, controller/processor 280, memory 282, transmit processor 264, TX MIMO processor 266, modulators 254, and/or antenna 252 with reference to FIG. 2 and wireless radios 901 and/or SRS transmitter 905 with reference to FIG. 9. After block 656 processing may end. Alternatively, processing may return from block 656 to block 650, block 652, or block 654.

Turning to FIG. 7A, a method of wireless communication includes blocks 700 and 702, which functionally correspond to blocks 602 and 604 respectively, as described above with respect to FIG. 6A. The process of FIG. 7A omits a configuration message transmission by the base station, as may occur if a UE is not configured by the base station. The UE may not be configured by the base station, for example, if the UE is configured by a different network entity, or if the UE begins operation with a default configuration.

Referring to FIG. 7B, a method of wireless communication includes blocks 750, 752, and 754, which functionally correspond to blocks 652, 654, and 656, respectively, as described above with respect to FIG. 6B. The process of FIG. 7B omits receipt of a configuration message transmitted by the base station, as may occur if the UE is not configured by the base station. The UE may not be configured by the base station, for example, if the UE is configured by a different network entity, or if the UE begins operation with a default configuration.

Figure 8:
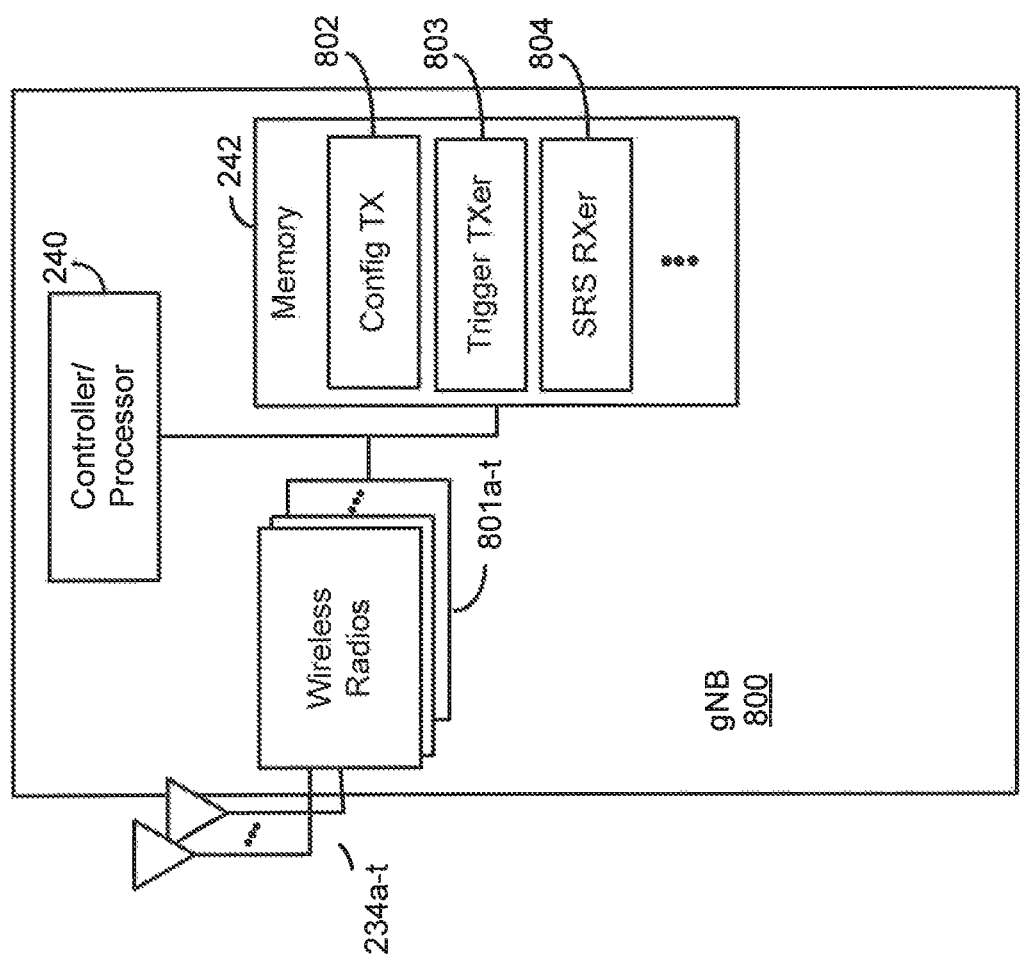
FIG. 8 is a block diagram illustrating a base station configured according to some embodiments of the present disclosure.

Turning now to FIG. 8, a base station 800, such as a NR-SS base station 105 (see FIG. 2), may have a controller/processor 240, a memory 242, and antennas 234a through 234t, as described above. The base station 800 may also have wireless radios 801a to 801t that comprise additional components also described above with reference to FIG. 2. The memory 242 of base station 800 stores algorithms that configure controller/processor 240 to carry out procedures as described above with reference to FIGS. 3-7.

Algorithms stored by memory 242 configure controller/processor 240 to carry out operations relating to wireless communication by the base station 800, as previously described. For example, configuration transmitter 802 configures controller/processor 240 to carry out operations that include transmitting, by the base station 800 to a user equipment (UE), one or more configuration messages to configure the UE in any manner previously described. Additionally, trigger transmitter 803 configures controller/processor 240 to carry out operations that include transmitting, by the base station 800 to the user equipment (UE), a trigger for aperiodic sounding reference signal (SRS) transmission in any manner previously described. Also, SRS receiver 804 configures controller/processor 240 to carry out operations that include receiving one or more SRS transmitted by the UE in any manner previously described.

Turning now to FIG. 9, a UE 900, such as a UE 115 (see FIG. 2), may have a controller/processor 280, a memory 282, and antennas 252a through 252r, as described above. UE 900 may also have wireless radios 901a to 901r that comprise additional components also described above with reference to FIG. 2. The memory 282 UE 900 stores algorithms that configure processor/controller 280 to carry out procedures as described above with reference to FIGS. 3-7.

Algorithms stored by memory 282 configure processor/controller 280 to carry out procedures relating to wireless communication by the UE 900, as previously described. For example, configuration receiver 902 configures controller processor 280 to carry out operations that include receiving, by the UE 900 from a base station, one or more configuration messages to configure the UE in any manner previously described. Additionally, trigger receiver 903 configures controller processor 280 to carry out operations that include receiving, from the base station, a trigger for aperiodic sounding reference signal (SRS) transmission for a group of one or more component carriers (CCs) in any manner previously described. Also, SRS resource set selector 904 configures controller processor 280 to carry out operations that include selecting for transmission, by the UE 900, one or more SRS resource sets in any manner previously described. Further, SRS transmitter 905 configures controller processor 280 to carry out operations that include transmitting, to the base station, one or more SRS in any manner previously described.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein e.g., the functional blocks and modules in FIGS. 2 and 6-9) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random access memory (RAM) memory, flash memory, read only memory (ROM) memory, erasable programmable ROM (EPROM) memory, electrically EPROM (EEPROM) memory, registers, hard disk, a removable disk, a compact disk ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described, for example, in FIGS. 6A, 6B, 7A, and/or 7B may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure.

Thus, the disclosure is not intended to be limited to the examples and designs described herein but is to be accorded the widest scope consistent with the principles and novel features disclosed herein.

What is claimed is:

1. A method of wireless communication, comprising:
receiving, by a user equipment (UE) from a base station, a trigger for aperiodic sounding reference signal (SRS) transmission for a group of component carriers (CCs), the group of CCs comprising at least two CCs, wherein at least one CC in the group of CCs has multiple SRS resource sets configured for the UE;
for each CC in the group of CCs:
selecting, by the UE, all SRS resource sets configured for antenna switching based on the CC having multiple SRS resource sets configured, and
selecting, by the UE, one SRS resource set based on the CC having only the one SRS resource set configured; and
transmitting, by the UE to the base station, one or more SRS transmissions on each CC of the group of CCs using the selected SRS resource sets.

2. The method of claim 1, wherein at least one SRS resource set configured for antenna switching is selected.

3. The method of claim 2, wherein two SRS resource sets configured for antenna switching are selected.

4. The method of claim 1, wherein the receiving the trigger for aperiodic SRS transmission for the group of CCs includes:
receiving a group common downlink control information (DCI) message.

5. The method of claim 4, wherein the group common DCI message comprises a DCI format 2_3 message.

6. The method of claim 1, wherein the transmitting includes:
transmitting, according to a predetermined sequence, the one or more SRS transmissions using the selected SRS resource sets.

7. The method of claim 6, wherein the transmitting according to the predetermined sequence includes:
transmitting, one CC at a time in ascending CC index order, the one or more SRS transmissions using the selected SRS resource sets in ascending SRS resource set index order.

8. A method of wireless communication, comprising:
transmitting, by a base station to a user equipment (UE), a trigger for aperiodic sounding reference signal (SRS) transmission for a group of component carriers (CCs), the group of CCs comprising at least two CCs, wherein at least one CC has multiple SRS resource sets configured for the UE; and
receiving, by the base station from the UE, one or more SRS transmissions, wherein, for each CC in the group of CCs:
the one or more SRS transmissions are received using all SRS resource sets configured for antenna switching, the all SRS resource sets configured for antenna switching being selected based on the CC having multiple SRS resource sets configured, and
the one or more SRS transmissions are received using one SRS resource set selected based on the CC having only the one SRS resource set configured.

9. The method of claim 8, wherein receiving the one or more SRS transmissions includes:
receiving the one or more SRS transmissions using at least one SRS resource set configured for antenna switching.

10. The method of claim 9, wherein receiving the one or more SRS transmissions includes:
receiving the one or more SRS transmissions using two SRS resource sets configured for antenna switching.

11. The method of claim 8, wherein the transmitting the trigger for the aperiodic SRS transmission for the group of CCs includes:
transmitting a group common downlink control information (DCI) message.

12. The method of claim 11, wherein the group common DCI message comprises a DCI format 2_3 message.

13. The method of claim 8, wherein the receiving includes:
receiving, according to a predetermined sequence, the one or more SRS transmissions using the selected SRS resource sets.

14. The method of claim 13, wherein the receiving according to the predetermined sequence includes:
receiving, one CC at a time in ascending CC index order, the one or more SRS transmissions using the selected SRS resource sets in ascending SRS resource set index order.

15. An apparatus for wireless communication, comprising:
means for receiving, by a user equipment (UE) from a base station, a trigger for aperiodic sounding reference signal (SRS) transmission for a group of component carriers (CCs), the group of CCs comprising at least two CCs, wherein at least one CC in the group of CCs has multiple SRS resource sets configured for the UE;
means for selecting, by the UE, for each CC in the group of CCs:
all SRS resource sets configured for antenna switching based on the CC having multiple SRS resource sets configured, and
one SRS resource set based on the CC having only the one SRS resource set configured; and
means for transmitting, by the UE to the base station, one or more SRS transmissions on each CC of the group of CCs using the selected SRS resource sets.

16. The apparatus of claim 15, wherein the means for selecting includes:
means for selecting at least one SRS resource set configured for antenna switching.

17. The apparatus of claim 16, wherein the means for selecting includes:
means for selecting for two SRS resource sets configured for antenna switching.

18. The apparatus of claim 15, wherein the means for receiving the trigger for aperiodic SRS transmission for the group of CCs includes:
means for receiving a group common downlink control information (DCI) message.

19. The apparatus of claim 18, wherein the group common DCI message comprises a DCI format 2_3 message.

20. The apparatus of claim 15, wherein the means for transmitting includes:
means for transmitting, according to a predetermined sequence, the one or more SRS transmissions using the selected SRS resource sets.

21. The apparatus of claim 20, wherein the means for transmitting according to the predetermined sequence includes:
means for transmitting, one CC at a time in ascending CC index order, the one or more SRS transmissions using the selected SRS resource sets in ascending SRS resource set index order.

22. An apparatus for wireless communication, comprising:
means for transmitting, by a base station to a user equipment (UE), a trigger for aperiodic sounding reference signal (SRS) transmission for a group of component carriers (CCs), the group of CCs comprising at least two CCs, wherein at least one CC has multiple SRS resource sets configured for the UE; and
means for receiving, by the base station from the UE, one or more SRS transmissions, wherein, for each CC in the group of CCs:
the one or more SRS transmissions are received using all SRS resource sets configured for antenna switching, the all SRS resource sets configured for antenna switching being selected based on the CC having multiple SRS resource sets configured, and
the one or more SRS transmissions are received using one SRS resource set selected based on the CC having only the one SRS resource set configured.

23. The apparatus of claim 22, wherein the means for receiving includes:
means for receiving the one or more SRS transmissions using at least one SRS resource set configured for antenna switching.

24. The apparatus of claim 23, wherein the means for receiving includes:
means for receiving the one or more SRS transmissions using two SRS resource sets configured for antenna switching.

25. The method of claim 22, wherein the means for transmitting the trigger for the aperiodic SRS transmission for the group of CCs includes:
means for transmitting a group common downlink control information (DCI) message.

26. The apparatus of claim 25, wherein the group common DCI message comprises a DCI format 2_3 message.

27. The apparatus of claim 22, wherein the means for receiving includes:
means for receiving, according to a predetermined sequence, the one or more SRS transmissions using the selected SRS resource sets.

28. The apparatus of claim 27, wherein the receiving according to the predetermined sequence includes:
receiving one CC at a time in ascending CC index order, the one or more SRS transmissions using the selected SRS resource sets in ascending SRS resource set index order.

29. An apparatus for wireless communication, comprising:
at least one processor;
a transceiver; and
at least one memory coupled to the at least one processor, wherein the at least one processor is configured to:
receive, by a user equipment (UE) from a base station via the transceiver, a trigger for aperiodic sounding reference signal (SRS) transmission for a group of component carriers (CCs), the group of CCs comprising at least two CCs, wherein at least one CC in the group of CCs has multiple SRS resource sets configured for the UE;
select, by the UE, for each CC in the group of CCs:
all SRS resource sets configured for antenna switching based on the CC having multiple SRS resource sets configured, and
one SRS resource set based on the CC having only the one SRS resource set configured; and
transmit, by the UE to the base station via the transceiver, one or more SRS transmissions on each CC of the group of CCs using the selected SRS resource sets.

30. The apparatus of claim 29, wherein the at least one processor is configured to select at least one SRS resource set configured for antenna switching.

31. The apparatus of claim 30, wherein the at least one processor is configured to select two SRS resource sets configured for antenna switching.

32. The apparatus of claim 29, wherein the at least one processor is configured to receive at least in part by:
receiving a group common downlink control information (DCI) message.

33. The apparatus of claim 32, wherein the group common DCI message comprises a DCI format 2_3 message.

34. The apparatus of claim 29, wherein the at least one processor is configured to transmit at least in part by:
transmitting, according to a predetermined sequence, the one or more SRS transmissions using the selected SRS resource sets.

35. The apparatus of claim 34, wherein the at least one processor is configured to transmit according to the predetermined sequence at least in part by:
transmitting, one CC at a time in ascending CC index order, the one or more SRS transmissions using the selected SRS resource sets in ascending SRS resource set index order.

36. An apparatus for wireless communication, comprising:
at least one processor;
a transceiver; and
at least one memory coupled to the at least one processor, wherein the at least one processor is configured to:
transmit, by a base station to a user equipment (UE) via the transceiver, a trigger for aperiodic sounding reference signal (SRS) transmission for a group of component carriers (CCs), the group of CCs comprising at least two CCs, wherein at least one CC has multiple SRS resource sets configured for the UE; and
receive, by the base station from the UE via the transceiver, one or more SRS transmissions, wherein, for each CC in the group of CCs:
the one or more SRS transmissions are received using all SRS resource sets configured for antenna switching, the all SRS resource sets configured for antenna switching being selected based on the CC having multiple SRS resource sets configured, and
the one or more SRS transmissions are received using one SRS resource set selected based on the CC having only the one SRS resource set configured.

37. The apparatus of claim 36, wherein the at least one processor is configured to receive at least in part by:
receiving the one or more SRS transmissions using at least one SRS resource set configured for antenna switching.

38. The apparatus of claim 37, wherein the at least one processor is configured to receive at least in part by:
receiving the one or more SRS transmissions using two SRS resource sets configured for antenna switching.

39. The apparatus of claim 36, wherein the at least one processor is configured to transmit the trigger for the aperiodic SRS transmission for the group of CCs at least in part by:

transmitting a group common downlink control information (DCI) message.

40. The apparatus of claim 39, wherein the group common DCI message comprises a DCI format 2_3.

41. The apparatus of claim 36, wherein the at least one processor is configured to receive at least in part by:
receiving, according to a predetermined sequence, the one or more SRS transmissions using the selected SRS resource sets.

42. The apparatus of claim 41, wherein the at least one processor is configured to receive according to the predetermined sequence at least in part by:
receiving, one CC at a time in ascending CC index order, the one or more SRS transmissions using the selected SRS resource sets in ascending SRS resource set index order.

43. A non-transitory computer-readable medium having instructions recorded thereon that, when enacted by one or more computer processors, cause the one or more computer processors to:
receive, by a user equipment (UE) from a base station, a trigger for aperiodic sounding reference signal (SRS) transmission for a group of component carriers (CCs), the group of CCs comprising at least two CCs, wherein at least one CC in the group of CCs has multiple SRS resource sets configured for the UE;
for each CC in the group of CCs:
select, by the UE, all SRS resource sets configured for antenna switching based on the CC having multiple SRS resource sets configured, and
select, by the UE, one SRS resource set based on the CC having only the one SRS resource set configured; and
transmit, by the UE to the base station, one or more SRS transmissions on each CC of the group of CCs using the selected SRS resource sets.

44. The non-transitory computer-readable medium of claim 43, wherein the instructions cause the one or more computer processors to select at least one SRS resource set configured for antenna switching.

45. The non-transitory computer-readable medium of claim 44, wherein the instructions cause the one or more computer processors to select two SRS resource sets configured for antenna switching.

46. The non-transitory computer-readable medium of claim 43, wherein the instructions cause the one or more computer processors to receive at least in part by:
receiving a group common downlink control information (DCI) message.

47. The non-transitory computer-readable medium of claim 46, wherein the group common DCI message comprises a DCI format 2_3 message.

48. The non-transitory computer-readable medium of claim 43, wherein the instructions cause the one or more computer processors to transmit at least in part by:
transmitting, according to a predetermined sequence, the one or more SRS transmissions using the selected SRS resource sets.

49. The non-transitory computer-readable medium of claim 48, wherein the instructions cause the one or more computer processors to transmit according to the predetermined sequence at least in part by:
transmitting, one CC at a time in ascending CC index order, the one or more SRS transmissions using the selected SRS resource sets in ascending SRS resource set index order.

50. A non-transitory computer-readable medium having instructions recorded thereon that, when enacted by one or more computer processors, cause the one or more computer processors to:
transmit, by a base station to a user equipment (UE), a trigger for aperiodic sounding reference signal (SRS) transmission for a group of component carriers (CCs), the group of CCs comprising at least two CCs, wherein at least one CC has multiple SRS resource sets configured for the UE; and
receive, by the base station from the UE, one or more SRS transmissions, wherein, for each CC in the group of CCs:
the one or more SRS transmissions are received using all SRS resource sets configured for antenna switching, the all SRS resource sets configured for antenna switching being selected based on the CC having multiple SRS resource sets configured, and
the one or more SRS transmissions are received using one SRS resource set selected based on the CC having on the one SRS resource set configured.

51. The non-transitory computer-readable medium of claim 50, wherein the instructions cause the one or more computer processors to receive the one or more SRS transmissions at least in part by:
receiving the one or more SRS transmissions using at least one SRS resource set configured for antenna switching.

52. The non-transitory computer-readable medium of claim 51, wherein the instructions cause the one or more computer processors to receive one or more SRS transmissions at least in part by:
receiving the one or more SRS transmissions using two all SRS resource sets configured for antenna switching.

53. The non-transitory computer-readable medium of claim 50, wherein the instructions cause the one or more computer processors to transmit the trigger for the aperiodic SRS transmission for the group of CCs at least in part by:
transmitting a group common downlink control information (DCI) message.

54. The non-transitory computer-readable medium of claim 53, wherein the group common DCI message comprises a DCI format 2_3 message.

55. The non-transitory computer-readable medium of claim 50, wherein the instructions cause the one or more computer processors to receive one or more SRS transmissions at least in part by:
receiving, according to a predetermined sequence, the one or more SRS transmissions using the selected SRS resource sets.

56. The non-transitory computer-readable medium of claim 55, wherein the instructions cause the one or more computer processors to receive one or more SRS transmissions according to the predetermined sequence at least in part by:
receiving, one CC at a time in ascending CC index order, the one or more SRS transmissions using the selected SRS resource sets in ascending SRS resource set index order.

* * * * *